United States Patent [19]
Galib

[11] Patent Number: 5,417,176
[45] Date of Patent: May 23, 1995

[54] UNDERWATER VORTEX SHEDDER

[75] Inventor: Thomas A. Galib, Portsmouth, R.I.

[73] Assignee: The United States of America as represented by the Secretary of the Navy, Washington, D.C.

[21] Appl. No.: 280,975

[22] Filed: Jul. 27, 1994

[51] Int. Cl.⁶ .............................................. B63H 25/06
[52] U.S. Cl. .................................. 114/162; 114/67 R; 114/312
[58] Field of Search ..................... 440/14, 15; 441/79; 114/162, 274, 20 R, 23, 25, 332, 330, 312, 243, 67 R, 126, 140, 127; 244/199, 200, 214

[56] References Cited

U.S. PATENT DOCUMENTS

| | | | |
|---|---|---|---|
| 1,838,519 | 12/1931 | Antoni | 440/15 |
| 3,440,993 | 4/1969 | Taylor, Jr. et al. | 114/243 |
| 4,548,149 | 10/1985 | Del Rosó | 114/162 |
| 5,335,886 | 8/1994 | Greenhalgh | 244/213 |

FOREIGN PATENT DOCUMENTS

| | | | |
|---|---|---|---|
| 460933 | 12/1913 | France | 440/15 |
| 2333701 | 8/1977 | France | 440/15 |
| 0030684 | 2/1982 | Japan | 114/243 |
| 0107993 | 7/1982 | Japan | 114/274 |
| 0152692 | 9/1983 | Japan | 114/67 R |

*Primary Examiner*—Edwin L. Swinehart
*Attorney, Agent, or Firm*—Michael J. McGowan; Prithvi C. Lall; Michael F. Oglo

[57] ABSTRACT

A self-propelled torpedo with four stabilizer fins having an "X" orientation when the torpedo is running submerged through water. Each stabilizer fin has a fixed leading section and a trailing rudder section with a rigid trailing edge. Bands of tape are wrapped fore and aft around each rudder section to provide opposed trailing extensions of tape which are adhered together and slitted to form a trailing extension of flexible material with separate strips along the full length of the rigid trailing edge. The trailing extension of flexible material provides for shedding trailing edge vortexes downstream for reducing the transmission of vortex energy upstream to the rudder.

7 Claims, 2 Drawing Sheets

UNDERWATER VORTEX SHEDDER

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION (1) Field of the Invention

The present invention deals with the hydrodynamic vortexes produced at the trailing edges of fins and other streamlined parts of underwater vehicles such as submarines and torpedoes and at the trailing edges of similar underwater parts of motor boats, sailboats and towed underwater bodies such as may be employed to carry sensors. The present invention relates to new and improved method and apparatus for shedding the trailing edge vortexes downstream from the underwater body so as to eliminate or significantly reduce the vortex induced vibration of the underwater body.

SUMMARY OF THE INVENTION

A principal aim of the present invention is to provide a new and improved method and apparatus for shedding hydrodynamic vortexes downstream from the rigid trailing edges of stabilizer fins and rudders of self-propelled underwater vehicles such as submarines and torpedoes so as to eliminate or significantly reduce the vortex induced vibration of the underwater vehicle.

Another aim of the present invention is to provide new and improved method and apparatus for shedding hydrodynamic vortexes downstream from the rigid trailing edge of an underwater body (self-propelled or otherwise) so as to eliminate or significantly reduce the transmission of energy upstream from the vortex to the underwater body.

Other objects will be in part obvious and in part pointed out more in detail hereinafter.

A better understanding of the invention will be obtained from the following detailed description and the accompanying drawings of an illustrative application of the invention.

DESCRIPTION OF PREFERRED EMBODIMENT

Figure 1:
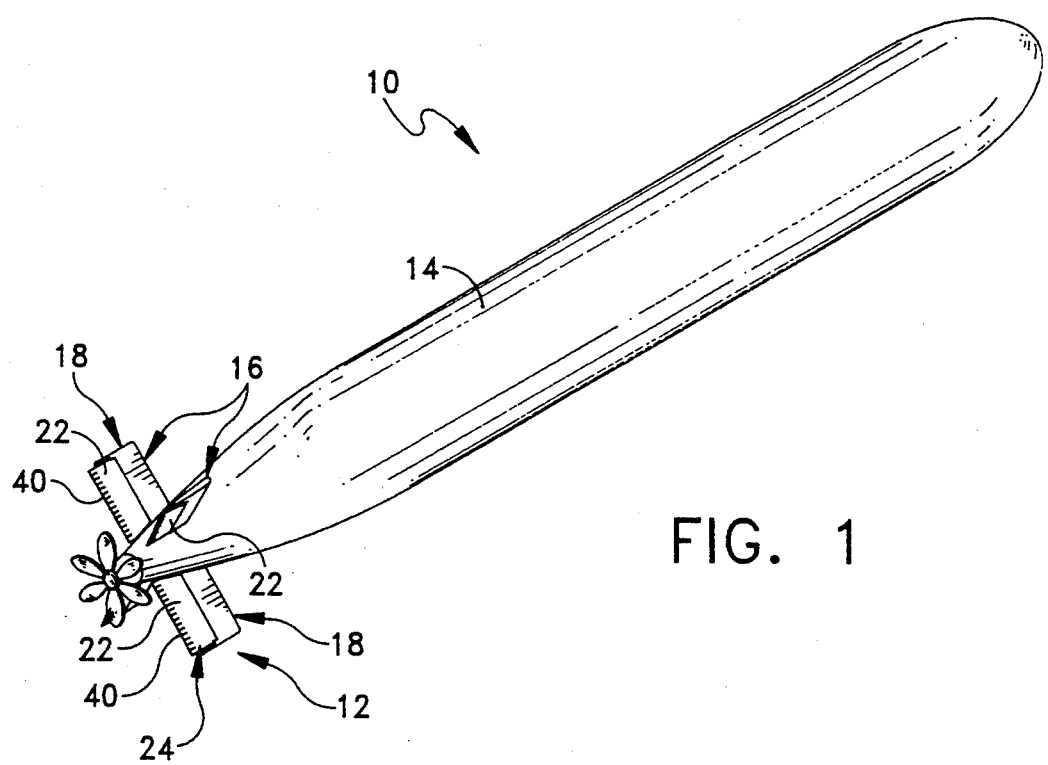
FIG. 1 is an isometric view of a torpedo incorporating an embodiment of an underwater vortex shedder of the present invention.
Figure 2:
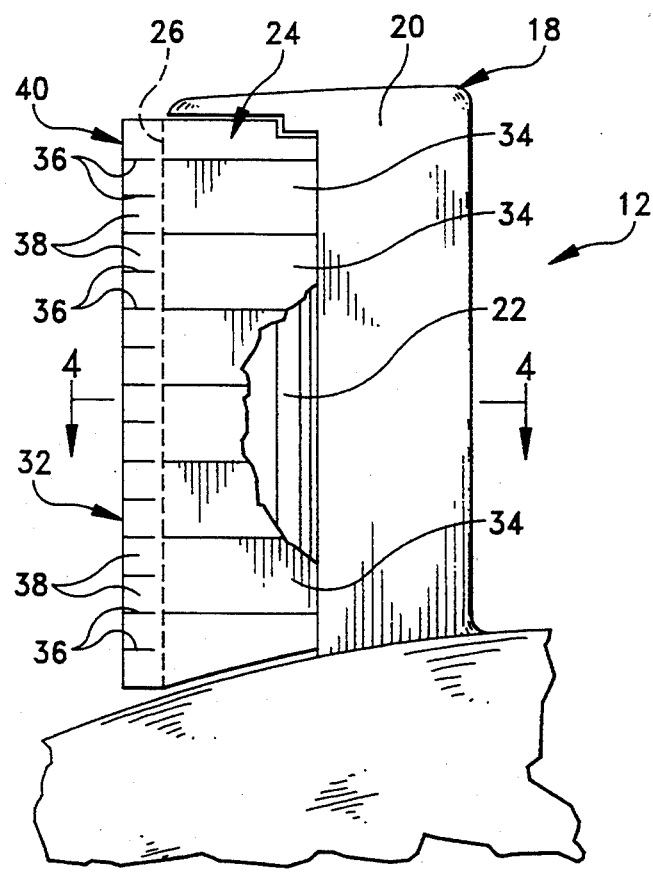
FIG. 2 is an enlarged partial axial view, partly broken away, of the tail structure of the torpedo.
Figure 3:
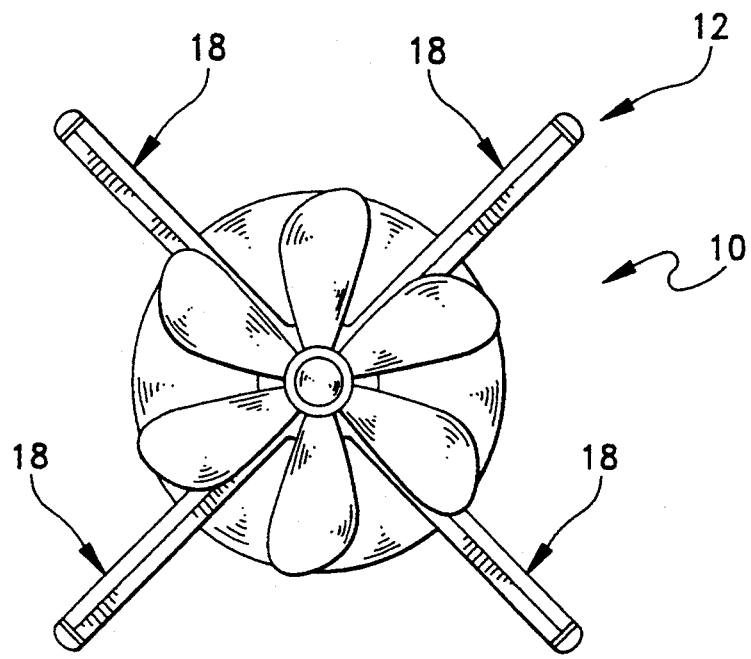
FIG. 3 is a rear end view of the torpedo showing the normal "X" orientation of the four stabilizer fins of the tail structure when the self-propelled torpedo is running submerged.
Figure 4:
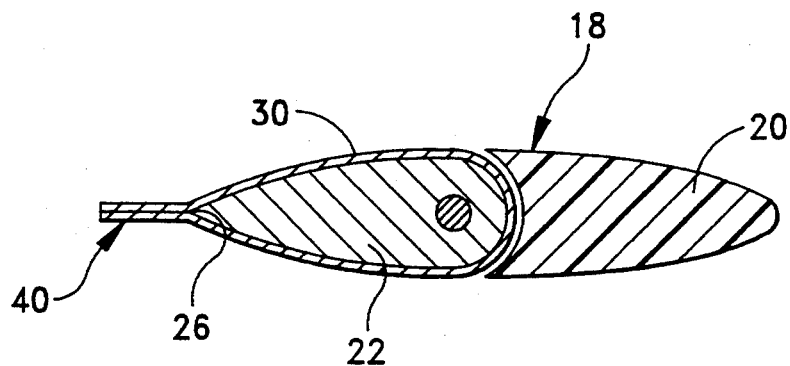
FIG. 4 is an enlarged transverse section view, in section, of a stabilizer fin taken substantially along line 4—4 of FIG.

In the drawings, like numerals are employed to designate the same or similar parts. A self-propelled torpedo 10 having a tail structure 12 incorporating a preferred embodiment of the present invention is shown in FIGS. 1–4. The torpedo 10 has a streamlined body 14 and a streamlined tail structure 12 of conventional design except for the addition of vortex shedders 40 incorporating the present invention. The tail structure 12 comprises a pair of identical stabilizers 16 mounted at right angles to each other and normally having a generally "X" orientation as shown in FIG. 3 when the torpedo 10 is running submerged through water. Each stabilizer 16 has a pair of identical, radially extending and diametrally opposed stabilizer fins 18. Each stabilizer fin 18 has a fixed leading edge section 20 and a trailing rudder section 22. The two rudder sections 22 of each stabilizer 16 are pivoted together about a common axis to form a rudder 24 for controlling the direction of the self-propelled torpedo 10 as it runs submerged through water. Each of the four stabilizer fins 18 has a streamlined shape to minimize the trailing edge turbulence.

Hydrodynamic vortexes are produced along the rigid trailing edge 26 of each fin 18 as the torpedo 10 is self-propelled through water. The vortexes can induce vibrations in the fin 18 and thereby adversely affect the acoustic properties of the torpedo 10. The degree of vibration is dependent in part on the structure of the fin 18 and the natural frequency of the fin 18 in relationship to the natural frequency of the vortex energy. In general, aluminum fins, which have a higher natural frequency than fins made of other conventional materials, are more susceptible to vortex induced vibration. Since torpedo rudders are normally made of aluminum, they are likely to be the source of undesirable vibration. Thus, the vortexes produced along the trailing edge 26 of each rudder section 22 are likely to transmit vibrations upstream to the rudder section 22 and from the rudder section 22 to the torpedo body 14. The vortex energy and the vibrations induced by the vortex energy normally increase with the angle of attack of the rudder 24.

A vortex shedder 40 incorporating the present invention is shown applied to each of the four rudder sections 22 to eliminate or substantially reduce the transmission of vortex energy upstream to the respective rudder section 22 and via the rudder 24 to the torpedo body 14. A length of tape 30 (FIG. 4) made of flexible sheet material is wrapped fore and aft about the surface of each rudder section 22 in a manner which does not adversely affect the hydrodynamic flow across the surface of the rudder 24. The tape 30 extends beyond the trailing edge 26 of the rudder 24 on both sides of the rudder 24. The opposed extensions of tape 30 are secured together to form a two-sided flexible extension 32 of sheet material along the rigid trailing edge 26 of the section 22. The tape 30 is preferably applied along the full length of each rudder section 22 to form a flexible extension 32 along the entire trailing edge 26 of each rudder section 22. The tape 30 preferably extends approximately one and one-half inches or more beyond the rigid trailing edge 26. The optimum length of the tape extension 32 is believed to be dependent upon the vortex energy and therefore the maximum angle of attack of the rudder 24 and the maximum speed of the torpedo 10. Thus, it may be found desirable to provide various lengths of tape extensions 32 on torpedoes and other streamlined underwater bodies which travel through the water at various speeds.

The described trailing edge extension 32 is preferably provided by using a tape 30 which is 3 to 5 inches wide and by wrapping bands 34 of tape 30 fore and aft about each rudder section 22 in generally abutting and non-overlapping relationship. A conventional high-quality duct tape has been found useful for this purpose. The strong adhesive property of conventional duct tape provides four adequately securing the tape 30 to the surface of the rudder 24 and for bonding the opposed trailing extensions of tape together. Longitudinal, trailing edge slits 36 are cut into the flat tape extension 32 up to approximately one-half inch from the rigid trailing edge 26 of the rudder 24 to form a plurality of separate trailing edge strips 38. The slits 36 are preferably spaced to form strips 38 which are approximately one and one-half inches wide. The tape 30 can be manually applied, has a smooth outer surface which maintains the smooth outer surface and contour of the rudder 24 and is inexpensive, readily available and easy to apply. Also, the tape 30 can be readily removed and replaced as desired. Since duct tape has a fabric body, the tape extension 32 is both strong and flexible. The tape extension 32 remains relatively flat except that the individual strips 38 are free to flutter independently back and forth to dampen the vortex energy.

By applying a tape 30 to a torpedo rudder as described, it has been found that the flexible trailing edge extension 32 sheds the vortexes produced along the trailing edge 26 of the rudder 24 in such a manner as to eliminate or significantly reduce vortex induced vibration of the rudder 24. Thus, it has been found that the vortex energy is not transmitted upstream to the rudder 24 to vibrate the rudder 24, tail structure 12 or torpedo body 14. Specifically, the flexible tape extensions 32 serve to eliminate the fin tone and broad band vibration otherwise normally created by the trailing edge vortexes. The vortex shedder has been tested on a buoyant, torpedo like, test vehicle by releasing the test vehicle from the bottom of a deep body of water so that it travels vertically upwardly to the surface. Suitable hydrophones were used to listen to the noise generated by the vertically moving torpedo. In that manner, it has been demonstrated that the vortex shedder 40 eliminates or significantly reduces vortex induced vibration as described. Insofar as presently understood, it is believed that, in effect, the trailing edge shedders 40 shift or shed the vortexes downstream from the rigid trailing edge 26 of the rudder 24 to eliminate or at least significantly reduce the transmission of energy upstream to the rudder 24. This is attributed in part to the flexibility and vibration dampening capability of the strips 38 of tape 30.

The vortex shedder 40 has been shown and described as it may be used on a self-propelled underwater torpedo of the type launched by a submarine. The vortex shedder may also be used on other types of underwater torpedoes, on submarines and on the streamlined underwater bodies of other aquatic vehicles such as sailboats, motorboats and underwater towed bodies.

As will be apparent to persons skilled in the art, various modifications, adaptations and variations of the foregoing specific disclosure can be made without departing from the teachings of the present invention.

What is claimed is:

1. A self-propelled, underwater vehicle comprising:
   stabilizer structure with a streamlined stabilizer fin with a rigid trailing edge;
   the stabilizer fin having a trailing extension of flexible material along at least part of the rigid trailing edge for shedding trailing edge vortexes downstream from the rigid trailing edge for reducing the transmission of vortex energy upstream to the stabilizer fin;
   the streamlined stabilizer fin comprises a fixed, leading section and a pivotal trailing section having said rigid trailing edge; and
   said extension of flexible material is provided by sheet material wrapped entirely around the pivotal section and providing opposed sheet material extensions adhered together to form said extension of flexible material.

2. A self-propelled, underwater vehicle according to claim 1, wherein:
   the sheet material is provided by a plurality of bands of tape wrapped fore and aft around the pivotal section.

3. A self-propelled, underwater vehicle according to claim 1 wherein:
   said extension of flexible material comprises a plurality of separate trailing strips of sheet material along the rigid trailing edge of the stabilizer fin.

4. A self-propelled, underwater vehicle according to claim 1 wherein:
   stabilizer structure with a streamlined stabilizer fin with a rigid trailing edge;
   the stabilizer fin having a trailing extension of flexible material along at least part of the rigid trailing edge for shedding trailing edge vortexes downstream from the rigid trailing for reducing the transmission of vortex energy upstream to the stabilizer fin;
   the stabilizer structure comprises a pair of stabilizers, each having a pair of radially extending and diametrically opposed stabilizer sections;
   the stabilizer sections of the pair of stabilizers normally have a generally "X" orientation when the vehicle is self-propelled through water;
   each of the stabilizer sections has a fixed, leading section and a pivotal trailing section having a rigid trailing edge; and
   sheet material is wrapped fore and aft around each pivotal section to provide opposed sheet material extensions which are adhered together to form a said extension of flexible material at the trailing edge of the pivotal section.

5. An aquatic vehicle comprising:
   a streamlined, underwater rudder with a rigid trailing edge;
   the rudder having a trailing extension of flexible material along at least a part of the rigid trailing edge of the rudder for shedding trailing edge vortexes downstream from the rigid trailing edge for reducing the transmission of vortex energy upstream to the rudder;
   said extension of flexible material extends along approximately the full length of the rigid trailing edge of the rudder; and
   said extension of flexible material is provided by sheet material wrapped fore and aft around the rudder and providing opposed sheet material extensions adhered together to form said extension of flexible material.

6. An aquatic vehicle according to claim 5 wherein:
   the flexible material is provided by a plurality of bands of tape wrapped fore and aft around the rudder and providing opposed sheet material extensions adhered together to form said extension of flexible material.

7. An aquatic vehicle according to claim 5 wherein:
   the extension of flexible material comprises a plurality of separate trailing strips of sheet material along the rigid trailing edge of the rudder.

* * * * *